United States Patent
Bock (10) Patent No.: US 11,080,715 B2
(45) Date of Patent: Aug. 3, 2021

(54) SYSTEM AND METHOD FOR REPRODUCING WORKS OF AUTHORSHIP

(71) Applicant: Joel N. Bock, Teaneck, NJ (US)

(72) Inventor: Joel N. Bock, Teaneck, NJ (US)

( * ) Notice: Subject to any disclaimer, the term of this patent is extended or adjusted under 35 U.S.C. 154(b) by 201 days.

(21) Appl. No.: 15/644,832

(22) Filed: Jul. 10, 2017

(65) Prior Publication Data

US 2017/0308855 A1  Oct. 26, 2017

Related U.S. Application Data

(63) Continuation of application No. 10/393,644, filed on Mar. 21, 2003, now Pat. No. 9,704,127.

(60) Provisional application No. 60/367,300, filed on Mar. 25, 2002.

(51) Int. Cl.
  *G06Q 30/00* (2012.01)
(52) U.S. Cl.
  CPC .................................. *G06Q 30/012* (2013.01)
(58) Field of Classification Search
  None
  See application file for complete search history.

(56) References Cited

U.S. PATENT DOCUMENTS

| | | | | |
|---|---|---|---|---|
| 6,122,739 | A * | 9/2000 | Kutaragi | G11B 7/24085 726/32 |
| 8,806,659 | B1 * | 8/2014 | Miazzo | G06F 21/10 726/30 |
| 9,704,127 | B2 * | 7/2017 | Bock | G06Q 30/012 |
| 2003/0182156 | A1 * | 9/2003 | Bock | G06Q 30/012 705/1.1 |
| 2007/0106794 | A1 * | 5/2007 | Manber | G06Q 30/02 709/225 |
| 2014/0122432 | A1 * | 5/2014 | Morgan | G06F 16/78 707/640 |

OTHER PUBLICATIONS

Music kiosks: On the right track?, kioskmarketplace.com, 2007 (Year: 2007).*

* cited by examiner

*Primary Examiner* — Dennis W Ruhl (57) ABSTRACT

In a method for reproducing an original copy of a work of authorship, processing information received from a data input device relating to authentication of the original copy of the work of authorship, identifying information in a database corresponding to the information received from the data input device, determining whether an authorization for reproduction of the work of authorship should be granted, and if authorization is granted, reproducing the work of authorship.

26 Claims, 6 Drawing Sheets

SYSTEM AND METHOD FOR REPRODUCING WORKS OF AUTHORSHIP

CROSS REFERENCE TO RELATED APPLICATIONS

This application is a continuation of U.S. patent application Ser. No. 10/393,644 filed Mar. 21, 2003, which claims the benefit of U.S. Provisional Application Ser. No. 60/367,300, filed Mar. 25, 2002.

FIELD OF THE INVENTION

The present invention relates to a business method for shifting, changing, reproducing and exchanging the physical embodiments of (copyrighted and uncopyrighted) works of authorship, including, for example, musical works, photographic works, cinematographic and video works, multimedia works, software works. More particularly, the business method according to the present invention provides for generating a revenue stream from the transfer or reproduction of a work from a first physical medium to or in a second physical medium, that can be the same, similar to or different than the first physical medium, and/or from issuing risk protection to the purchasers of a work in a physical medium.

BACKGROUND OF THE INVENTION

The continual movement and development of technology has affected many businesses as well as consumers. As technology develops, products and older technologies become outdated, outmoded, obsolete and phased out over time. Often older technologies become unsupported due to the lack of availability of products for implementing or utilizing those technologies and/or with respect to the availability of replacement parts for the products. For example, in the 1970 s 8-Track music players were very popular and many consumers purchased 8-Track players and 8-Track tapes. By the mid-1980 s virtually all sources of 8-Track tapes (except for the used market) had vanished and no companies were manufacturing or selling 8-Track players any longer. However, many consumers who had collections of 8-Track tapes were left with no recourse upon breakage or damage to their 8-Track players. Those consumers had no recourse but to purchase entirely new music collections or, if lucky enough, to transfer their 8-Track collections to a different format, such as cassette tape prior to damage to their 8-Track players.

The extinction of the media formats for works of authorship, for example, 8-Track, and other formats placed and places an unfair burden on consumers who have already paid for certain rights in the work of authorship contained in or on the purchased medium. The consumer purchasing a work of authorship, irrespective of the type of medium, has already paid for many rights, including, for example, artist royalties, producer royalties, writer royalties, and mechanical royalties and for the record company marketing costs. Upon obsolescence of a particular medium or technology, such as, for example, 8-Track, the consumer after paying for all of the rights, including those relating to copyrights, is left with a copy of the work in or on a particular medium for which the consumer paid, but no method for accessing that work. The same is true in other situations where there may be no issues of obsolescence. For example, with respect to a copy of a work where the medium is damaged and the consumer has no way of properly accessing the work or accessing the work in its undamaged state or unadulterated manner, there should be a way for the owner to access the work. Also, in the situation where the owner purchases a new media device, such as, for example, a MP3 player, or wishes to utilize or have access to the work in a different format or different location other than the original copy or the original medium, such as, for example, on a computer, PDA or other portable or stationary device, the owner should be able to utilize or access the work. Additionally, where a consumer wants to create a backup copy of a work for archival purposes, while the costs for CD or DVD burners have decreased over time, there is still the need for a computer, which many people do not have, to allow reproductions of CDs or DVDs.

Since the rights holders in works of authorship have a legitimate interest in ensuring that they are properly remunerated by parties that desire to have access to their works, it is important that any copying or reproducing of such works or authorship be accomplished legitimately and only for allowable purposes, such as archival/backup of the original copy of the work, for purposes of time shifting or for purposes of having unfettered access to the work, e.g., in a different format, for example copying from CD to cassette.

However, once the medium in which a work is stored is damaged there is no method for transferring the work to the same or different type of medium so as to preserve the copy or embodiment of the work purchased by the consumer. Additionally, there is no method for allowing the consumer access to the purchased work, while ensuring that the rights holders' interests in the works are adequately protected, for example, by receiving compensation for access to their works.

SUMMARY OF THE INVENTION

The present invention provides a business method for ensuring that after damage to or obsolescence of the medium in which a work of authorship is stored, after a decision is made to utilize a different medium to store or access the work, where a backup copy of a work is desired or for any other reason, the work can be reproduced in or on the same or different type of medium, thereby allowing access to the work by the purchaser without having to repay for the same rights that have already been paid for. The present invention also provides a business method for allowing reproduction of a copy of a work of authorship while ensuring that the prior existence of a copy of the work of authorship is being verified or that a copy of the work of authorship has previously been obtained from an authorized source, thereby ensuring that the holders of rights in the work have been previously compensated for the work. The present invention also provides a system and method for reproducing or transferring a work of authorship in or onto a different medium and preventing access to the original medium after such reproduction. The present invention also provides a business method for financially securing or safeguarding, or hedging against risk of damage or loss of copies of works of authorship, and particularly copies of works of authorship stored on CDs, DVDs, Videos, cassettes and other storage media.

The business method, and the system and method according to the present invention allow a party that has purchased a copy of a work of authorship, for example, a music recording, such as a CD, to replace or create an additional copy of the work, for example, when it becomes damaged, when the party wishes to have access to the work of authorship in or on a different medium, for backup purposes or for any other reason. For example, if a consumer purchases a CD and a few months later the CD becomes damaged, for example, it becomes scratched, prior to this invention, the consumer would have to purchase a new copy of the CD, repaying for all of the rights previously paid for, including writer royalties, artist royalties, mechanical royalties, etc. According to the present invention, the consumer may obtain a reproduction copy of the work on CD either at the time of purchase or at a later point in time for a reduced cost which would reflect the previously paid for rights. This can be accomplished at the time of purchase or later be ascertaining that the consumer either purchased the work of authorship or currently has a copy, for example, a CD, of the work of authorship. Although the original copy is damaged, the same work of authorship can be reproduced either through the use of a high quality system that is able to reproduce the work from the original medium and remove or bypass the damages, or by copying from an undamaged copy of the same work of authorship.

The business method, and the system and method according to the present invention may provide for verification that the consumer has a copy of the work of authorship. This can be accomplished through the use of a manual or automatic verifier, such as, for example, in the case of a CD, a CD player that can read the coding on the CD to determine whether the CD is a legitimate copy, what songs are on the CD (the artist and album) and when and by whom the CD was manufactured. Additionally, new types of coding, including, for example, digital, electronic, visual, audio, etc., may be placed on CDs to identify various types of information and to ensure that the copy is legitimate.

Alternatively and/or additionally, the consumer May present, manually or automatically, information verifying that the copy was legitimately obtained, including, for example, purchase verification, via receipt, smart card, etc. Such verification along with presentation of the original copy of the work would provide the necessary information to allow reproduction of the work.

In certain situations, as a way of preventing a consumer from retaining the original copy of the work of authorship or obtaining more than one copy of the work of authorship to replace the damaged copy, further access to the work on the original copy would need to be prevented. This could be accomplished, for example, by placing an electronic or manual block on the copy, by placing coding on the copy that indicates that it has already been replaced or by destroying or confiscating the original copy of the work of authorship.

The original copy may be destroyed, for example, by passing it to a device after copying and/or verification that crushes, scratches, melts or otherwise permanently interferes with access by a consumer to the work embodied within or on that medium, or access to the work may be prevented by a blocking mechanism, such as, for example, password protection, coding, encryption, etc.

The reproduction of the work of authorship can be accomplished using the same medium that stored the original copy of the work or authorship. For example, if the original copy of the work of authorship was embodied on a compact disc, the reproduction can also be embodied on a compact disc. This can be achieved by copying the work onto or into a temporary storage device (RAM) or computer memory and downloading from the RAM or computer memory onto a compact disc. Alternatively, the work may be transferred directly from one compact disc to the other or stored in a temporary location for transfer to a different compact disc. The work may also be transferred from a database containing a copy of the work or from another copy of the work.

The reproduction of the work of authorship may be accomplished by using a different medium than used to store the original copy of the work of authorship. For example, if the original work of authorship was embodied on a phonorecord, the reproduction can be embodied on a compact disc. This can be achieved by copying the work onto or into a temporary storage device (RAM) or computer memory and downloading from the RAM or computer memory onto a compact disc. Alternatively, the work may be transferred directly from the phonorecord to the compact disc or stored in a temporary location for transfer to the compact disc.

In situations where the original medium in which the work of authorship is damaged such that the work of authorship is unaccessible, for example, scratched, warped, melted or cracked, in place of transferring the work of authorship directly (or indirectly) from the original medium to a second medium (the same or different), the work of authorship may be reproduced or copied from a different copy of the work of authorship obtained from an identical medium and stored, for example, in a database or in computer memory, or it may be reproduced or copied from a different copy of the work of authorship stored, for example, in a local or remote database, or downloaded via the Internet from the publisher or from some other source.

The reproduction of a work of authorship may be accomplished utilizing a system comprising a microprocessor or some other controller or control device, a data reader or reading device, such as, for example, a CD player, a DVD player, a cassette player, a phonograph, or a VCR, etc., a data recorder or recording device, such as, for example, a CD-RW drive, DVD-RW drive, cassette recorder, or a software program for recording digitally to a memory device, such as, for example, a RAM, a PROM, EEPROM, SmartMedia Card, Compact Media Card, or flash memory, and a destruction or access blocking device, such as, for example, a crushing or scratching device, or a coding or encryption device. The system may also comprise a storage device (temporary or long term), such as, for example, RAM, ROM, hard drive, optical drive, tape drive, CD, DVD, cassette, flash memory, etc., and/or a data input device, such as, for example, a keyboard, scanner, bar code reader, smart card reader, biometric device, or any other device for entering information about a transaction or customer.

Information relating to each transaction, including, for example, information relating to the work of authorship, the customer, temporal information and financial information, may be stored in memory or may be sent to a local or remote storage location (as close as, for example, a separate memory device in the same black-box or a different portion of the same memory). This information may be used for later verification for allowing a reproduction of a work of authorship or for purposes of marketing/promotion/advertising. The system may require the customer to view information or respond to queries during the time that the reproduction is being accomplished, in exchange for a reduced fee or no fee for the reproduction, or in exchange for permitting use of the system. The information stored on the original medium, the new medium and/or memory, including historical information, information relating to the work of authorship, data regarding viewed information, and collected information may be transferred or transmitted immediately to a remote location or may be stored for later transfer or transmission. Additionally, this information may be transferred to the owner of the work of authorship or the owner of the rights in the work of authorship in exchange for the right to reproduce the work of authorship.

The business method, and the system and method according to the present invention can be accomplished by verifying that the medium being delivered to the system for reproduction includes an authentic copy of the work of authorship or that a copy of the work of authorship was purchased by the customer. Upon verification the work may be reproduced on the same or a different medium either using the copy embodied on the original medium, or using a copy obtained from a different medium. Upon reproduction of the work of authorship, the original medium may be destroyed or access may be blocked (temporarily or permanently).

The new embodiment of the work of authorship may be labeled or imprinted with the relevant information regarding the work. For a musical work this may include, for example, the title of the work, the writer, the performer, the publisher, length, etc. Alternatively, labels may be prepared which can be affixed to the embodiment of the work of authorship. The new embodiment of the work of authorship may also be dispensed with a case, and inserts that identify the work. For example, for an embodiment of the work of authorship on CD, there may be inserts printed for the work that include all or some of the information as included in CDs that are sold in retail establishments. These CD embodiments may be dispensed in the same type of jewel case used for CDs sold in retail establishments. In the case of backup copies, the work could be sealed in shrink wrap for extra protection, and there would be no need for the inserts or same type of packaging used for the original copy, although purchase of such packaging could be an additional option offered to the customer. The customer would pay an additional fee for the backup copy, that could be a reduced amount compared to the fee for the original copy.

The method according to the present invention for financially securing or safeguarding copies of works of authorship, and particularly copies of works of authorship stored on CDs, DVDs, Videos, cassettes and other storage media may be accomplished by providing for an additional payment by the purchaser at the time of purchasing the copy of the work of authorship. This payment is used to remunerate the author of the work and the owner of the original embodiment of the work from which the original reproductions were made, or to provide cover for the risk undertaken by the supplier of the copy of the work of authorship. This remuneration allows the owner of the rights to provide an additional or replacement copy or the right for the purchaser to make a copy of the same work for a lower price than originally obtained or paid, as a result of the need for payment for fewer than all of the rights originally paid for. The availability of cover allows the supplier of the copy of the work of authorship to hedge, protect or insure against a loss resulting from the obligation to provide a replacement copy of the work of authorship, and allows the purchaser to hedge or cover against the risk of damage or loss. The amounts that would be charged the purchaser may be calculated based on actuarial tables or statistical information relating to the numbers of copies of works of authorship that are damaged compared to the total purchases, or some other statistical information, including the number of purchasers that would be likely to take advantage of such a risk protection program. The cover or insurance may be available to cover a predetermined period of time or an indefinite period of time so long as certain purchase information is provided, or it may be always available so long as the copy of the work of authorship is returned with the claim for remuneration or replacement. In essence this business method would be a damage and/or loss insurance for the copy of the work of authorship. This could be, for example, scratch insurance for CDs or DVDs, erasure insurance for Videos or cassettes, and warping insurance for LPs.

DETAILED DESCRIPTION

Figure 1:
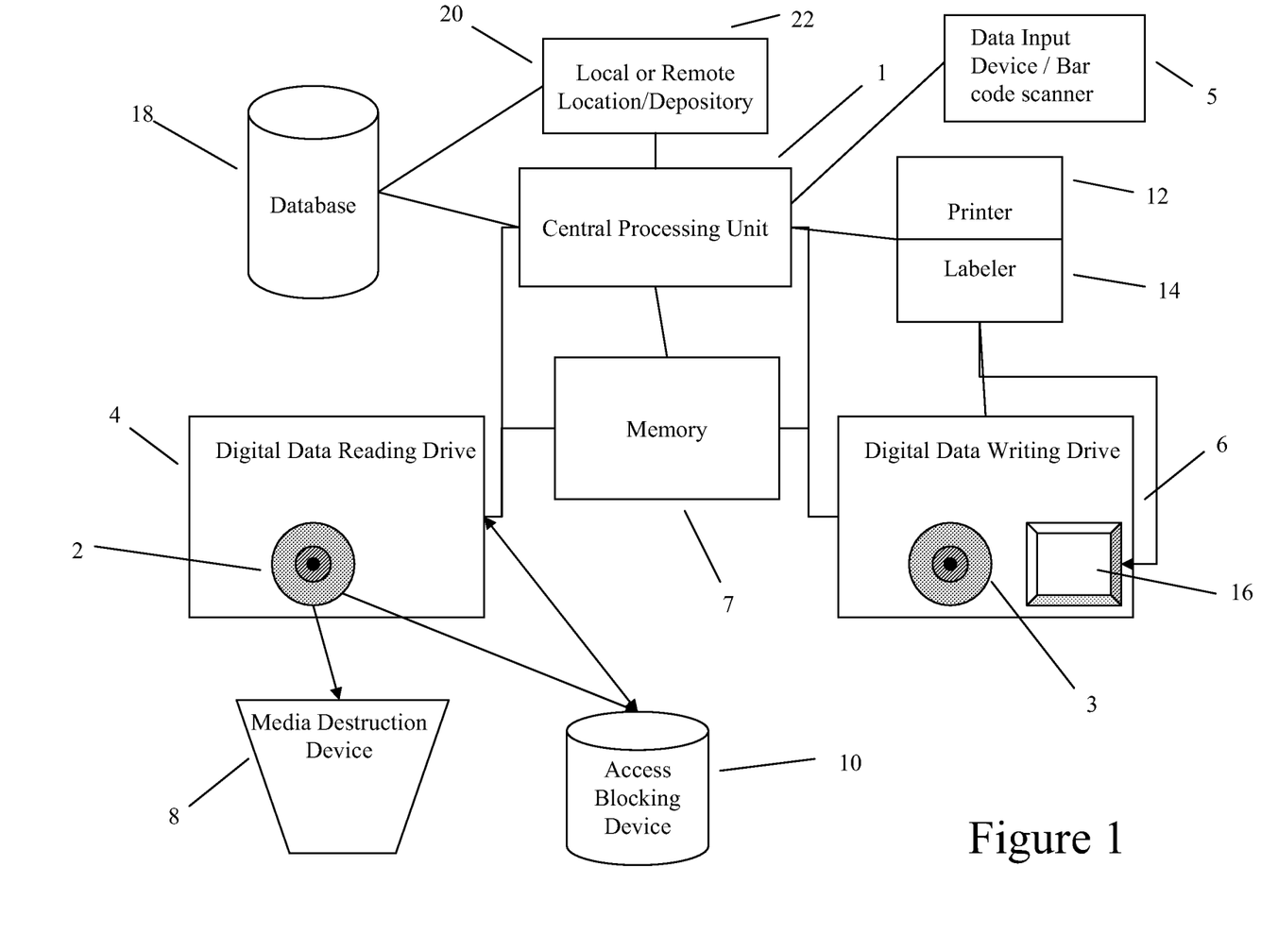
FIG. 1 shows a system for reproducing a work of authorship according to a first embodiment of the present invention.

A first embodiment according to the present invention is shown in FIG. 1, which depicts a compact disc (CD) reproduction system where a work of authorship is reproduced on the same medium. The system includes a central processing unit 1 that controls the formatting and copying of a work of authorship from an original medium 2 to a new medium 3. The central processing unit 1 is coupled to a digital data reading drive 4, for example, a CD drive, that reads information stored on the original medium 2 on which the work of authorship is stored, for example a CD. The information stored on the original medium 2 may include or upon purchase be modified to include the date and location of purchase, vendor information, purchase price, artist and writer information, album name, song list, publishing information, purchaser information, etc. The central processing unit 1 is also coupled to a digital data writing drive 6, for example, a CD-RW drive, and it controls the copying of the work of authorship from the digital data reading drive 4 to the digital data writing drive 6. Alternatively or additionally, the system may include a memory 7 for storing or buffering the digital data comprising the work of authorship during and/or prior to reproduction of the work of authorship by copying from the original medium 2 located in the digital data reading drive 4 to the new medium 3 located in the digital data writing drive 6. The memory 7 may also store the information read from the original medium 2.

In this first embodiment according to the present invention the work of authorship is reproduced on the same media type as the original medium 2, a CD. Along with the work of authorship, additional information may be transferred to the new medium 3, including all of the information included on the original medium 2. Additionally, new information may be added to the new medium 3, including information relating to the date of reproduction, price paid, customer information, vendor information, quality of original medium 2, status of original medium 2, etc., using a data input device 5, such as, for example, a keyboard, scanner, bar code reader, smart card reader, biometric device, or any other device for entering information about a transaction or customer.

The system also includes a media destruction device 8 or an access blocking device 10 which prevents use of the original medium 2 upon reproduction of the work of authorship on the new medium 3 by destroying the original medium 2 or blocking access to the work of authorship contained on the original medium 2.

The system may also include a printer 12 or labeler 14, coupled to the central processing unit 1, for imprinting the new medium 3 with, or creating labels to be attached to the new medium 3 that include, information relating to the work of authorship. This information may include artist and writer information, album and song information, publisher information, etc. The printer 12 may also print inserts, which may include information relating to the work of authorship, to be included in a storage case 16 dispensed with, and which is used to store, the new medium 3.

The system may include a database 18 that stores information relating to each transaction, i.e., reproduction of a work of authorship, including customer information, work of authorship information, location and temporal information, etc., and/or may transmit such information to a local or remote location 20 or depository 22 (as close as a different adjacent computer or room, or even a different memory device located in the same black-box or a different section of the same memory device).

Figure 2:
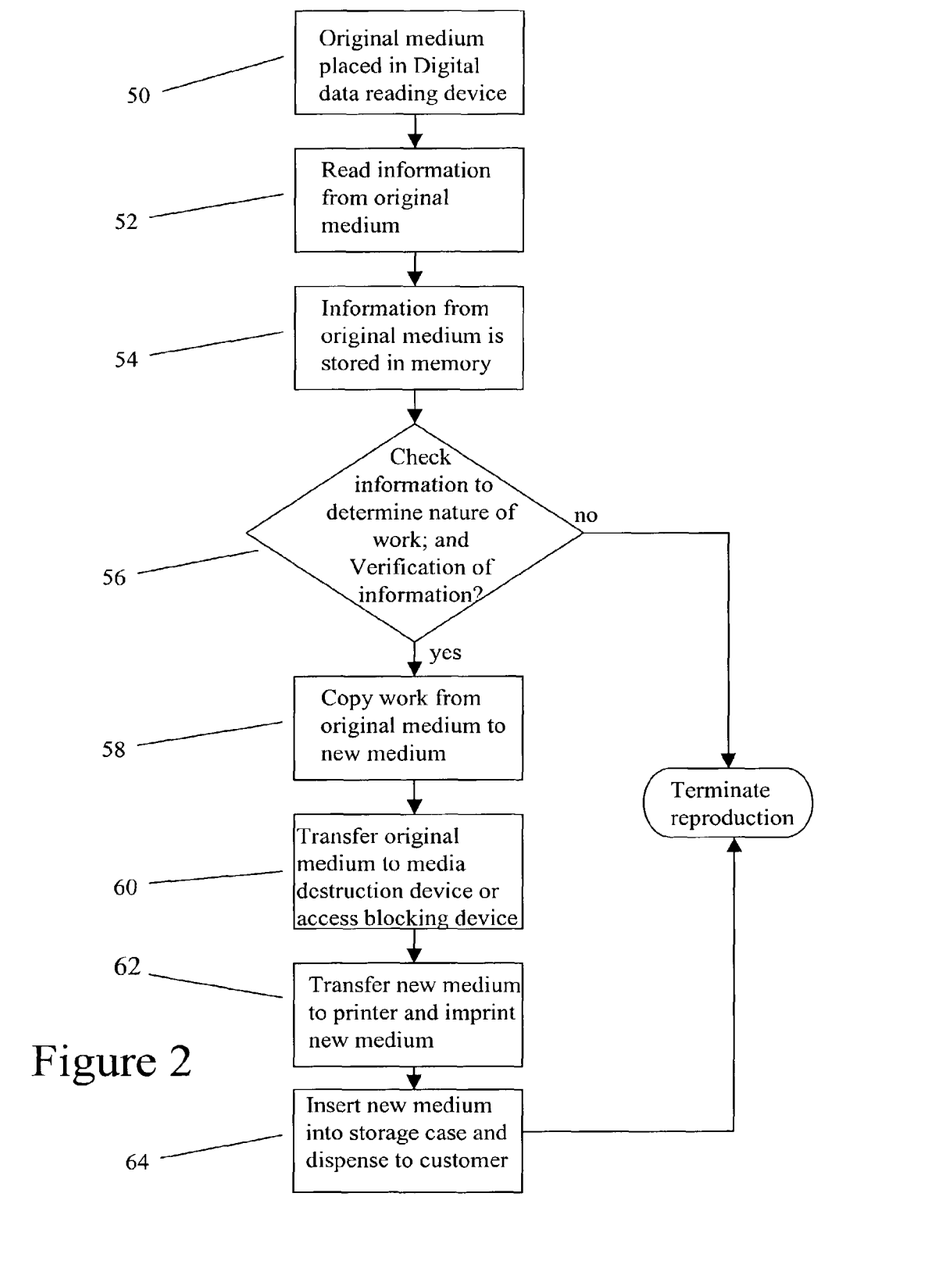
FIG. 2 shows a method for reproducing a work of authorship according to the first embodiment of the present invention.

The method according to the first embodiment of the present invention is shown in the flow diagram of FIG. 2. In step 50, the customer places the original medium 2, a CD, in the digital data reading device 4. In step 52, the information is read from the original medium 2, and in step 54, is stored in the memory 7. In step 56, the information from the original medium 2 is checked to determine the nature of the work of authorship. The information stored on the original medium 2 may also be checked for authenticity, for date of purchase, purchaser information or for purposes of verification. For example, the system may only be operable for the original purchaser of that embodiment of the work of authorship. Alternatively or additionally, the system may only be operable where the purchase price is greater than a predetermined amount or the reproduction fee may vary depending upon the original purchase price.

Alternatively or additionally, the system may include a step requiring the customer to view information or respond to queries, or may collect information from the customer during the reproduction process in exchange for the right to reproduce the work of authorship or for a reduction in or elimination of the cost for reproduction of the work of authorship. The information stored in memory 7 and/or the collected information or data regarding the viewed information or responses to the queries may be transferred to the local or remote location 20 or depository 22 immediately or stored for a later transfer. The information stored in memory 7 and/or the collected information may also be provided to the owner of the work of authorship or the owner of the rights to the work of authorship in exchange for the right to reproduce the work of authorship.

The system may include an additional step of collection of a fee from the customer either before, during or after the reproduction process. The fee may be collected in cash, electronically, using a credit or debit card, or some other method of payment.

Upon verification of the information on the original medium 2, in step 58, the system copies the work of authorship from the original medium 2 to the new medium 3 located in the digital data writing device 6. In step 60, the original medium 2 is transferred to the media destruction device 8 or the access blocking device 10, where the original medium 2 is destroyed or access to the work of authorship on the original medium 2 is blocked. The destruction may be accomplished by breaking, crushing, scratching, melting, burning, sanding, pitting, cracking or any other method of destruction. Blocking access to the work of authorship may be accomplished by retaining the original medium or sealing the original medium in an impenetrable medium or in a medium the removal of which would cause the destruction of or damage to the original medium 2, or by encrypting the data on the original medium 2 or by overlaying or inserting a password protection mechanism into the original medium 2.

In step 62, the system transfers the new medium 3 to a printer 12 where the information stored in memory 7, i.e., regarding the work of authorship, including artist, writer, album, publisher and song information, is imprinted onto the new medium 3. An insert including the same and/or additional information may also be printed by the printer 12 and placed into a storage case 16. In step 64, the new medium 3 is inserted into the storage case 16 and dispensed to the customer.

Figure 3:
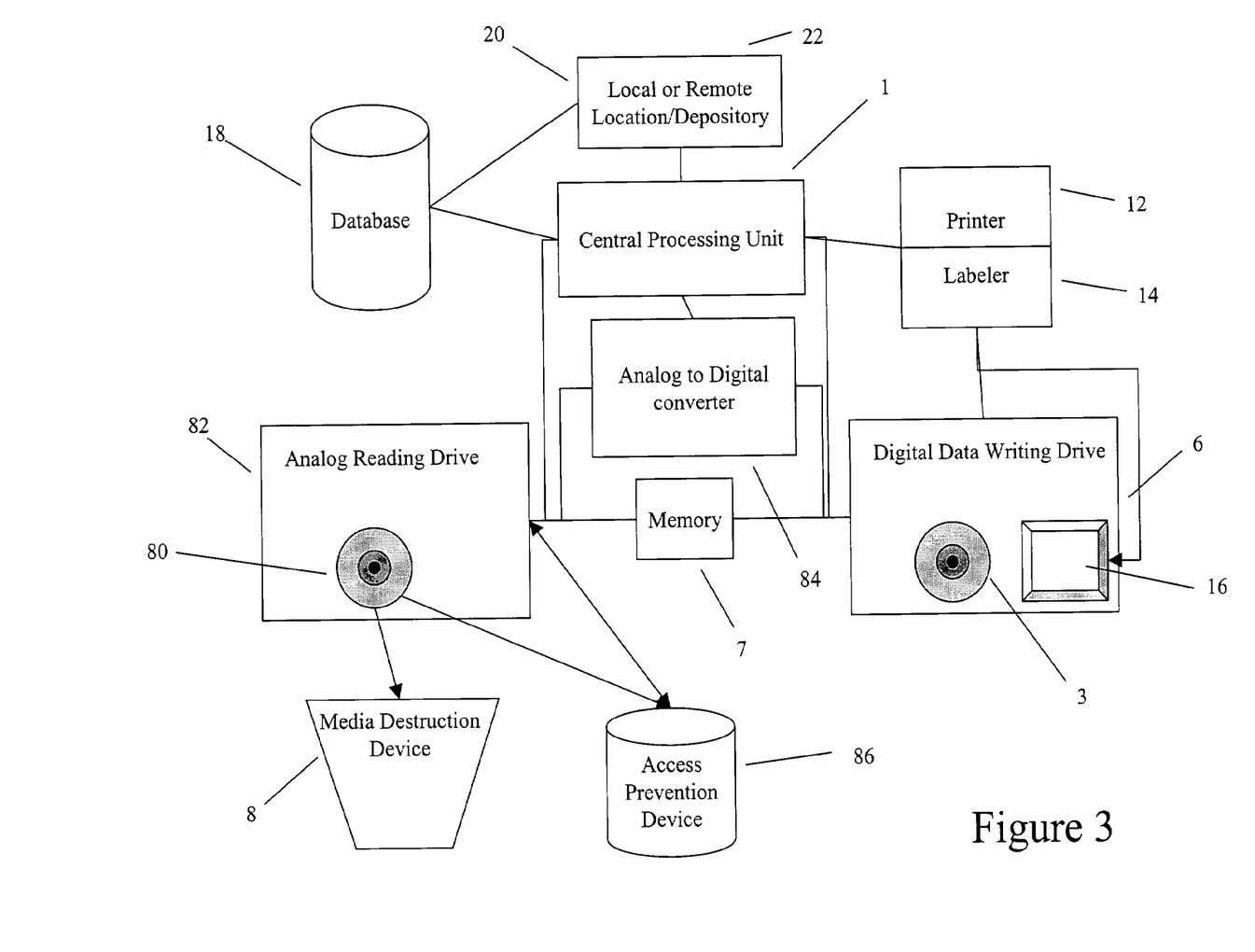
FIG. 3 shows a system for reproducing a work of authorship according to a second embodiment of the present invention.

A second embodiment according to the present invention is shown in FIG. 3, which depicts a phonorecord to compact disc (CD) reproduction system where the original work of authorship is reproduced on a different medium. The numbering for the similar components will remain the same. The system includes a central processing unit 1 that controls the formatting and copying of a work of authorship from an original medium 80 to a new medium 3. The central processing unit 1 is coupled to an analog reading device 82, for example, a phonograph, that reads the data stored on the original medium 80 on which the work of authorship is stored, for example an LP. The central processing unit 1 is also coupled to a digital data writing drive 6, for example, a CD-RW drive, and it controls the copying of the work of authorship from the original medium 80 using the analog reading device 82 to the new medium 3 using the digital data writing drive 6. An analog to digital converter 84 is coupled to the analog reading device 82, the digital data writing drive 6 and the central processing unit 1, and is used to convert the analog data from the original medium 80 to digital data to be stored on the new medium 3. The data read from the original medium 80 may be analyzed to identify the work of authorship and/or to determine whether it is an authentic copy of the work of authorship or for other verification purposes. The system, using text recognition software, may also read the information contained on the label of the original medium 80 (for purposes of verification), covert it into digital data and store that information as digital data in a memory 7. Such information may include artist and writer information, album name, song list, publishing information, etc. Alternatively or additionally, the system may store or buffer the digital data comprising the work of authorship in memory 7 during and/or prior to reproduction of the work of authorship by copying from the original medium 80 located in the analog data reading device 82 to the new medium 3 located in the digital data writing drive 6. The memory 7 may also store the information read from the original medium 80.

In this second embodiment according to the present invention the work of authorship is reproduced on a different media type than the original medium 80. Along with the work of authorship, additional information may be transferred to the new medium 3, including all of the information included on the label of the original medium 80, after it is converted into digital data. Additionally, new information may be added to the new medium 3, including information relating to the date of reproduction, price paid, customer information, vendor information, quality of original medium 80, status of original medium 80, etc.

The system also includes a media destruction device 8 or access prevention device 86 which prevents use of the original medium 80 upon reproduction of the work of authorship on the new medium 3 by destroying the original medium 80 or preventing access to the work of authorship contained on the original medium 80.

The system may also include a printer 12 or labeler 14, coupled to the central processing unit 1, for imprinting the new medium 3 with, or creating labels to be attached to the new medium 3 that include, information relating to the work of authorship. This information may include artist and writer information, album and song information, publisher information, etc. The printer 12 may also print inserts, which may include information relating to the work of authorship, to be included in a storage case 16 dispensed with, and which is used to store, the new medium 3.

The system may include a database 18 that stores information relating to each transaction, i.e., reproduction of a work of authorship, including customer information, work of authorship information, location and temporal information, etc., and/or may transmit such information to a local or remote location 20 or depository 22 (as close as a different adjacent computer or room, or even a different memory device located in the same black-box or a different section of the same memory device).

Figure 4:
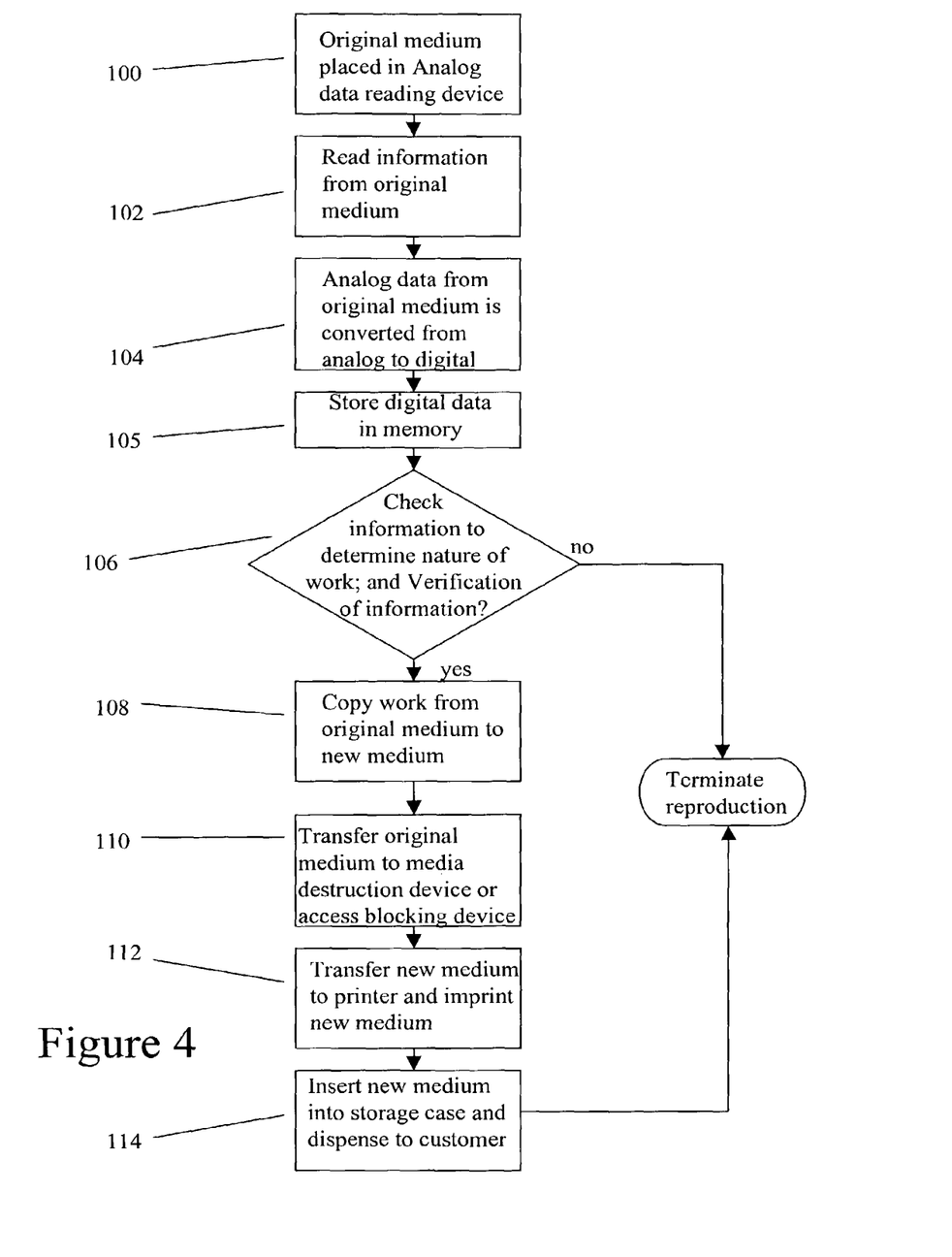
FIG. 4 shows a method for reproducing a work of authorship according to the second embodiment of the present invention.

The method according to the second embodiment of the present invention is shown in the flow diagram of FIG. 4. In step 100, the customer places the original medium 80, an LP, in the analog data reading device 82. In step 102, the data is read from the original medium 80, in step 104, the analog data is converted from analog to digital, and in step 105, the digital data is stored in the memory 7. In step 106, the data from the original medium 80 is checked to determine the nature of the work of authorship. The information included on the label of the original medium 80 may also be read using text recognition software and analyzed for purposes of identification of the work of authorship, and verifying information relating to the work of authorship. For example, the system may only be operable for embodiments originating from the U.S., or only from particular sources.

Alternatively or additionally, the system may include a step requiring the customer to view information or respond to queries, or may collect information from the customer during the reproduction process in exchange for the right to reproduce the work of authorship or for a reduction in or elimination of the cost for reproduction of the work of authorship. The information stored in memory 7 and/or the collected information or data regarding the viewed information or responses to the queries may be transferred to the local or remote location 20 or depository 22 immediately or stored for a later transfer. The information stored in memory 7 and/or the collected information may also be provided to the owner of the work of authorship or the owner of the rights to the work of authorship in exchange for the right to reproduce the work of authorship.

The system may include an additional step of collection of a fee from the customer either before, during or after the reproduction process. The fee may be collected in cash, electronically, using a credit or debit card, or some other method of payment.

Upon verification of the data or textual information on the original medium 80, in step 108, the system copies the work of authorship from the original medium 80 stored in memory 7 as digital data to the new medium 3 located in the digital data writing device 6. In step 110, the original medium 80 is transferred to the media destruction device 8 or the access blocking device 10, where the original medium 80 is destroyed or access to the work of authorship on the original medium 80 is blocked. The destruction may be accomplished by breaking, crushing, scratching, melting, burning, sanding, pitting, cracking or any other method of destruction. Blocking access to the work of authorship may be accomplished by retaining the original medium 80 or scaling the original medium 80 in an impenetrable medium or in a medium the removal of which would cause the destruction of or damage to the original medium 80.

In step 112, the system transfers the new medium 3 to a printer 12 where the information stored in memory 7, i.e., regarding the work of authorship, including artist, writer, album, publisher and song information, is imprinted onto the new medium 3. An insert including the same and/or additional information may also be printed by the printer 12 and placed into a storage case 16. In step 114, the new medium 3 is inserted into the storage case 16 and dispensed to the customer.

Figure 5:
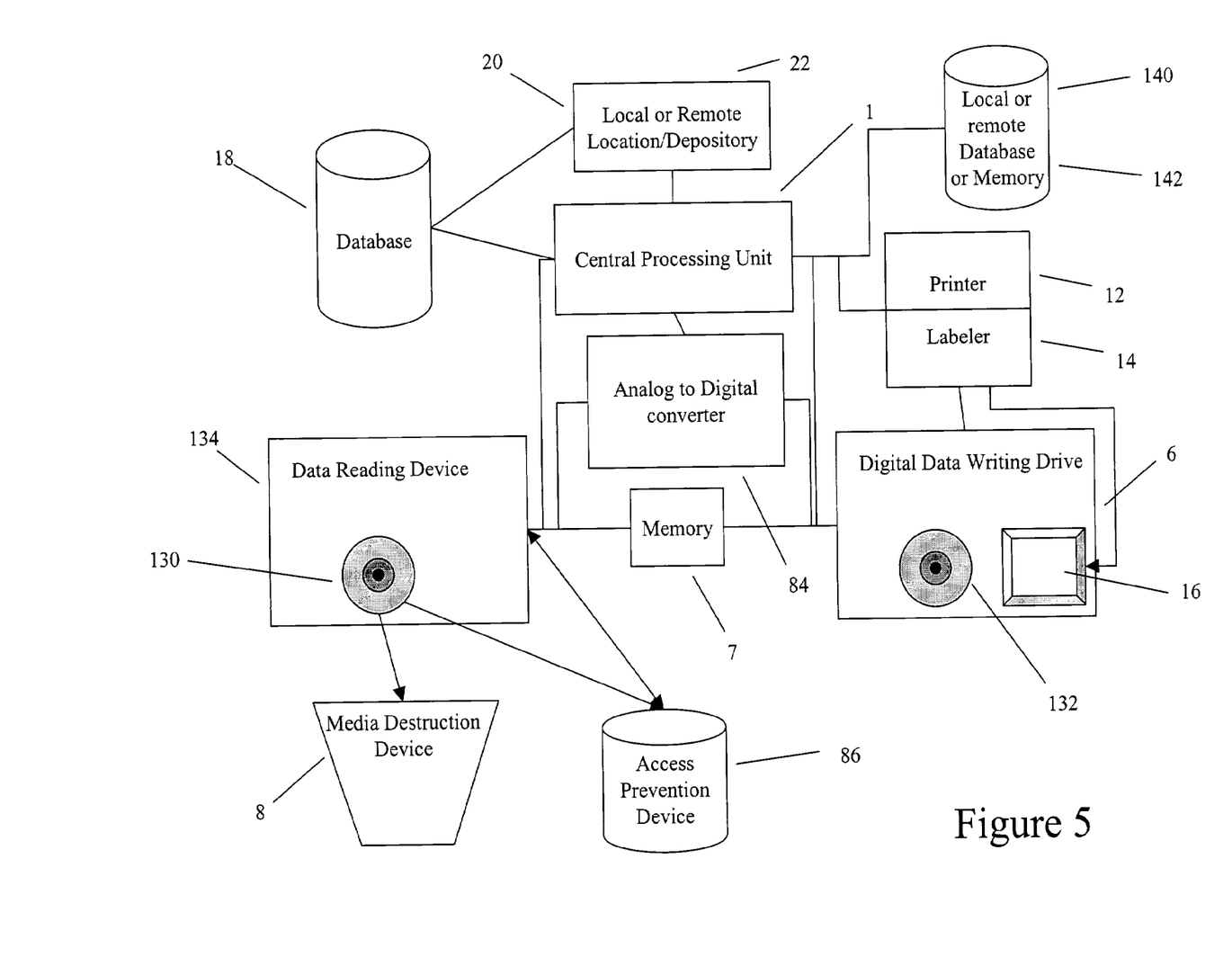
FIG. 5 shows a system for reproducing a work of authorship according to a third embodiment of the present invention.

A third embodiment according to the present invention is shown in FIG. 5, which depicts a first medium to a second medium reproduction system where the original work of authorship is reproduced on either the same or a different medium. The numbering for the similar components will remain the same. The system includes a central processing unit 1 that controls the formatting and copying of a work of authorship from an original medium 130 to a new medium 132. The central processing unit 1 is coupled to a data reading device 134, for example, a phonograph or CD drive, that reads the data and information stored on the original medium 130 on which the work of authorship is stored, for example an LP or CD. The information stored on the original medium 130 may include or upon purchase be modified' to include the date and location of purchase, vendor information, purchase price, artist and writer information, album name, song list, publishing information, purchaser information, etc. An analog to digital converter 84 may be coupled to the data reading device 134, and the central processing unit 1, and is used when the original medium is of an analog format to convert the analog data from the original medium 130 to digital data for purposes of identification and/or verification. The data read from the original medium 130 may be analyzed to identify the work of authorship and/or to determine whether it is an authentic copy of the work of authorship or for other verification purposes. Where the original medium 130 is analog, the system, using text recognition software, may also read the information contained on the label of the original medium 130 (for purposes of verification), covert it into digital data and store that information as digital data in a memory 7. Such information may include artist and writer information, album name, song list, publishing information, etc. Additionally, information from the original medium 130 in digital format may be stored in memory 7.

The central processing unit is also coupled to a local or remote database 140 or memory 142 which may contain a full or partial catalog of works of authorship, including, for example, musical, film, literary, photographic, pictorial, graphical, artistic, and multimedia works, in digital or other format. The local or remote database 140 or memory 142 and the central processing unit 1 are also coupled to a digital data writing drive 6, for example, a CD-RW drive, and it controls the copying of the work of authorship from the local or remote database 140 or memory 142, upon identification and/or verification of the work of authorship based on the information stored on the original medium 130 or the information from the label of the original medium 130, to the new medium 132 using the digital data writing drive 6. Alternatively or additionally, the system may store or buffer the digital data comprising the work of authorship in memory 7 during and/or prior to reproduction of the work of authorship by copying from the local or remote database 140 or memory 142 to the memory 7.

In this third embodiment according to the present invention the work of authorship is reproduced on either the same or a different media type than the original medium 130. Along with the work of authorship, additional information may be transferred to the new medium 132, including all of the information included on the original medium 130 or label of the original medium 130, after it is converted into digital data. This information may be transferred directly from the original medium 130 or from the memory 7. Additionally, new information may be added to the new medium 132, including information relating to the date of reproduction, price paid, customer information, vendor information, quality of original medium 130, status of original medium 130, etc.

The system also includes a media destruction device 8 or access prevention device 86 which prevents use of the original medium 130 upon reproduction of the work of authorship on the new medium 132 by destroying the original medium 130 or preventing access to the work of authorship contained on the original medium 130.

The system may also include a printer 12 or labeler 14, coupled to the central processing unit 1, for imprinting the new medium 132 with, or creating labels to be attached to the new medium 132 that include, information relating to the work of authorship. This information may include artist and writer information, album and song information, publisher information, etc. The printer 12 may also print inserts, which may include information relating to the work of authorship, to be included in a storage case 16 dispensed with, and which is used to store, the new medium 132.

The system may include a database 18 that stores information relating to each transaction, i.e., reproduction of a work of authorship, including customer information, work of authorship information, location and temporal information, etc., and/or may transmit such information to a local or remote location 20 or depository 22 (as close as a different adjacent computer or room, or even a different memory device located in the same black-box or a different section of the same memory device).

Figure 6:
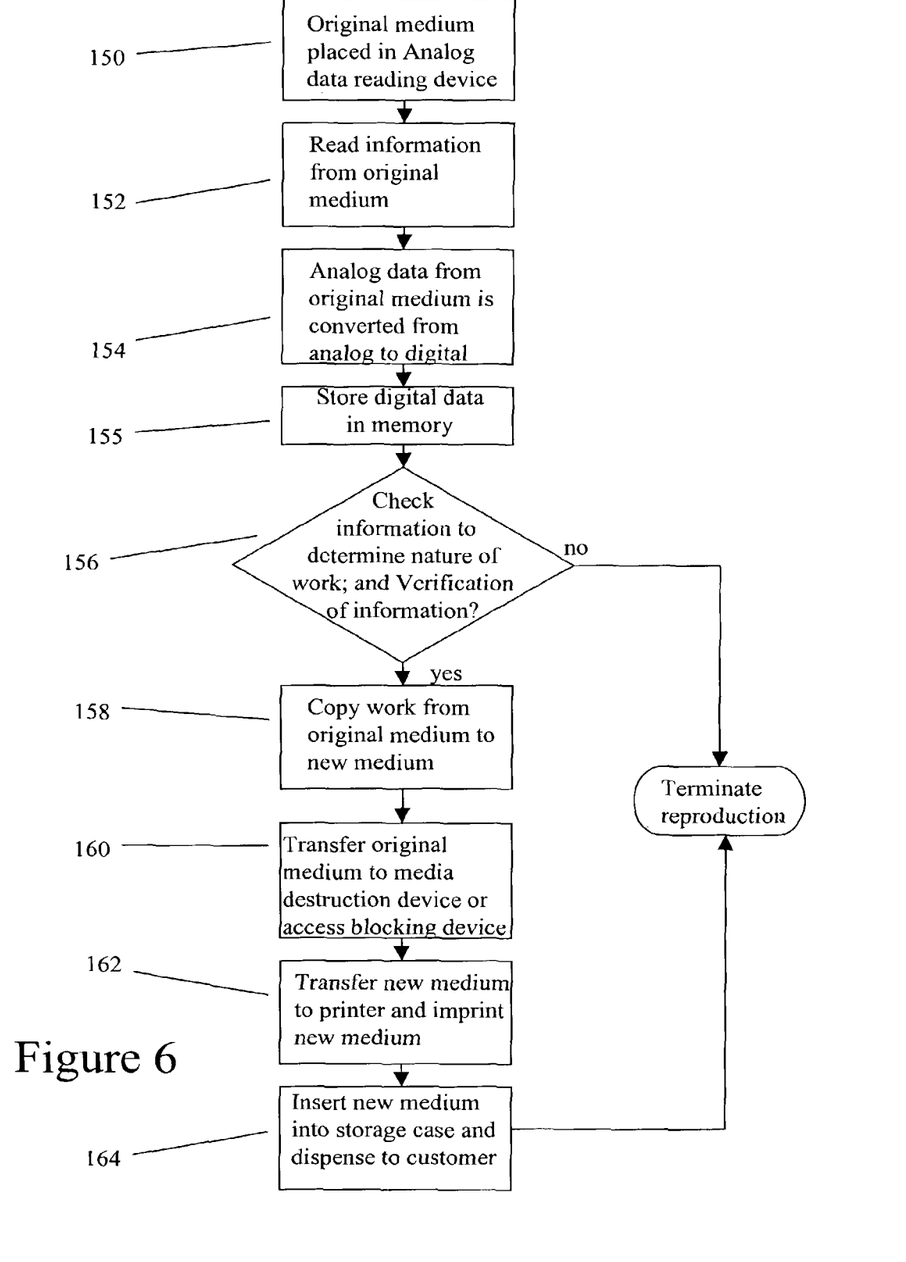
FIG. 6 shows a method for reproducing a work of authorship according to the third embodiment of the present invention.

The method according to the third embodiment of the present invention is shown in the flow diagram of FIG. 6. In step 150, the customer places the original medium 130, a CD or an LP, in the data reading device 134. In step 152, the data is read from the original medium 130, in step 154, the data may be converted from analog to digital, and in step 155, the digital data is stored in the memory 7. In step 156, the data from the original medium 130 is checked to determine the nature of the work of authorship. The information included on the label of the original medium 130 may also be read using text recognition software and analyzed for purposes of identification of the work of authorship, and verifying information relating to the work of authorship. For example, the system may only be operable for embodiments originating from the U.S., or only from particular sources.

Alternatively or additionally, the system may include a step requiring the customer to view information or respond to queries, or may collect information from the customer during the reproduction process in exchange for the right to reproduce the work of authorship or for a reduction in or elimination of the cost for reproduction of the work of authorship. The information stored in memory 7 and/or the collected information or data regarding the viewed information or responses to the queries may be transferred to the local or remote database 140 or memory 142 immediately or stored for a later transfer. The information stored in memory 7 and/or the collected information may also be provided to the owner of the work of authorship or the owner of the rights to the work of authorship in exchange for the right to reproduce the work of authorship.

The system may include an additional step of collection of a fee from the customer, either before, during or after the reproduction process. The fee may be collected in cash, electronically, using a credit or debit card, or some other method of payment.

Upon verification of the data or textual information on the original medium 130, in step 158, the system copies the work of authorship from the original medium 130 stored in memory 7 as digital data to the new medium 3 located in the digital data writing device 6. In step 160, the original medium 130 is transferred to the media destruction device 8 or the access blocking device 10, where the original medium 130 is destroyed or access to the work of authorship on the original medium 130 is blocked. The destruction may be accomplished by breaking, crushing, scratching, melting, burning, sanding, pitting, cracking or any other method of destruction. Blocking access to the work of authorship may be accomplished by retaining the original medium 130 or sealing the original medium 130 in an impenetrable medium or in a medium the removal of which would cause the destruction of or damage to the original medium 130.

In step 162, the system transfers the new medium 3 to a printer 12 where the information stored in memory 7, i.e., regarding the work of authorship, including artist, writer, album, publisher and song information, is imprinted onto the new medium 3. An insert including the same and/or additional information may also be printed by the printer 12 and placed into a storage case 16. In step 164, the new medium 3 is inserted into the storage case 16 and dispensed to the customer.

What is claimed is:
1. A method, comprising:
receiving a first digital data relating to a work of authorship from a remote device;
automatically accessing via a processor the first digital data;
processing the first digital data using the processor;
determining whether a digital copy of the work of authorship is at least one of properly obtained, properly retained, authorized for reproduction, or not blocked from reproduction by analyzing a correspondence between the first digital data relating to the work of authorship and a second digital data received by the processor relating to the digital copy of the work of authorship using digital data other than digital data comprising the work of authorship or digital data comprising the digital copy of the work of authorship, wherein the second digital data comprises other than digital data comprising the work of authorship or digital data comprising the digital copy of the work of authorship;
automatically verifying an authorization for downloading, reproducing, or retaining of the digital copy of the work of authorship via the processor based on a determination that the digital copy of the work of authorship is at least one of properly obtained, properly retained, authorized for reproduction, or not blocked from reproduction; and upon authorization of downloading, reproduction, or retention of the digital copy of the work of authorship being verified, enabling at least one of a download of the digital copy of the work of authorship, a transfer of the digital copy of the work of authorship, or retention of the digital copy of the work of authorship.

2. The method according to claim 1, wherein the authorization for downloading, reproduction, or retention of the digital copy of the work of authorship is not enabled until the processor detects a submission of data for the downloading, reproduction, or retention of the digital copy of the work of authorship.

3. The method of claim 1, wherein the digital data other than digital data comprising the work of authorship or digital data comprising the digital copy of the work of authorship is obtained via at least one of a bar code scanner, a keyboard, a CD reader, a DVD reader, a memory device, a hard drive, a RAM, a PROM, an EEPROM, a SmartMedia card, a compact media card, or a flash memory.

4. The method of claim 1, wherein the digital data other than digital data comprising the work of authorship or digital data comprising the digital copy of the work of authorship is obtained via a database.

5. The method of claim 1, further comprising if authorization is denied or not verified, preventing access to the work of authorship or the digital copy of the work of authorship.

6. The method of claim 5, wherein access to the work of authorship or the digital copy of the work of authorship is prevented by using at least one of access blocking, password protection, encryption, coding, or retaining electronic control over the original storage location of the work of authorship.

7. The method according to claim 1, wherein the determination as to whether the digital copy of the work of authorship is at least one of properly obtained, properly retained, authorized for reproduction, or not blocked from reproduction is based on a verification of the submission of data for the downloading, reproduction, or retention of the digital copy of the work of authorship.

8. The method of claim 1, wherein the digital data other than digital data comprising the work of authorship or digital data comprising the digital copy of the work of authorship comprises at least one of the date and location of purchase, vendor information, purchase price, artist information, writer information, album name, song list, publishing information, purchaser information, information relating to the date of reproduction, price paid, customer information, vendor information, quality of the original medium, or status of the original medium.

9. The method of claim 1, wherein the work of authorship or the digital copy of the work of authorship is at least one of downloaded, reproduced, or retained on an MP3 player, a PDA, or a portable device.

10. The method of claim 1, wherein the download or transfer occurs via the Internet.

11. A system, comprising:
a microprocessor;
a first memory coupled to the microprocessor, wherein the first memory stores a first digital data relating to a work of authorship;
a second memory coupled to the microprocessor, wherein the second memory receives a second digital data relating to a digital copy of the work of authorship from a remote device, wherein the microprocessor is coupled to the first memory, wherein the first memory includes instructions that cause the microprocessor to determine whether the digital copy of the work of authorship is at least one of properly obtained, properly retained, authorized for reproduction, or not blocked from reproduction, by analyzing a correspondence between the first digital data relating to the work of authorship and the second digital data relating to the digital copy of the work of authorship, wherein the second digital data comprises other than digital data comprising the work of authorship or digital data comprising the digital copy of the work of authorship, and automatically verify an authorization for downloading, reproducing, or retaining of the digital copy of the work of authorship based on a determination that the digital copy of the work of authorship is at least one of properly obtained, properly retained, authorized for reproduction, or not blocked from reproduction, wherein upon authorization of downloading, reproduction, or retention of the digital copy of the work of authorship being verified by the microprocessor, control at least one of transmission of digital content to or reception of digital data from the remote device.

12. The system of claim 11, wherein the second set of digital data comprises at least one of the date and location of purchase, vendor information, purchase price, artist information, writer information, album name, song list, publishing information, purchaser information, information relating to the date of reproduction, price paid, customer information, vendor information, quality of the original medium, or status of the original medium.

13. The system of claim 11, wherein the second set of digital data is obtained via at least one of a bar code scanner, a keyboard, a CD reader, a DVD reader, a memory device, a database, a hard drive, a RAM, a PROM, an EEPROM, a SmartMedia card, a compact media card, or a flash memory.

14. The system of claim 11, wherein the second set of digital data is obtained via a database.

15. The system of claim 11, further comprising if authorization is denied or not verified, preventing access to the work of authorship or the digital copy of the work of authorship.

16. The system of claim 15, wherein access to the work of authorship or the digital copy of the work of authorship is prevented by using at least one of access blocking, password protection, encryption, coding, or retaining electronic control over the original storage location of the work of authorship.

17. The system of claim 11, wherein the determination as to whether the digital copy of the work of authorship is at least one of properly obtained, properly retained, authorized for reproduction, or not blocked from reproduction is based on a verification of the submission of data for the downloading, reproduction, or retention of the digital copy of the work of authorship.

18. The system of claim 11, further comprising at least one of a local computer, a remote computer, or a depository where the second set of digital data is located.

19. The system of claim 11, wherein the work of authorship or the digital copy of the work of authorship is at least one of downloaded, reproduced, or retained on an MP3 player, a PDA, or a portable device.

20. The system of claim 11, wherein the download or transfer occurs via the Internet.

21. The system of claim 11, wherein the digital content or digital data is the digital copy of the work of authorship.

22. A system, comprising:
a server; and
a memory, wherein the memory contains instructions that cause the server to
store a first set of digital data relating to a work of authorship,
receive a second set of digital data relating to a digital copy of the work of authorship from a remote device,
compare the first set of digital data and the second set of digital data, and
verify, based on the comparison, using at least one portion of the second set of digital data, an authorization for the download or transfer of the digital copy of the work of authorship, wherein the at least one portion of the second set of digital data represents other than digital data comprising the work of authorship, and
upon verification, controlling the download or transfer of at least one of the work of authorship, the digital copy of the work of authorship, or a third set of digital data relating to the work of authorship or the digital copy of the work of authorship.

23. The system of claim 22, wherein the at least one portion of the second set of digital data comprises at least one of the date and location of purchase, vendor information, purchase price, artist information, writer information, album name, song list, publishing information, purchaser information, information relating to the date of reproduction, price paid, customer information, vendor information, quality of the original medium, or status of the original medium.

24. The system of claim 22, wherein the third set of digital data consists of the at least one portion of the second set of digital data.

25. The system of claim 22, wherein the server controls the download or transfer of (a) at least one of the work of authorship or the digital copy of the work of authorship, and (b) the third set of digital data relating to the work of authorship or the digital copy of the work of authorship.

26. The system of claim 22, wherein the download or transfer occurs via the Internet.

* * * * *